(12) United States Patent
Asmus et al.

(10) Patent No.: US 11,978,489 B1
(45) Date of Patent: May 7, 2024

(54) DIRECT MEASUREMENT OF MAGNETORESISTIVE HEAD RESISTANCE IN A STORAGE SYSTEM

(71) Applicant: INTERNATIONAL BUSINESS MACHINES CORPORATION, Armonk, NY (US)

(72) Inventors: Jake Asmus, Tucson, AZ (US); Larry LeeRoy Tretter, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/319,984

(22) Filed: May 18, 2023

(51) Int. Cl.
  *G11B 5/00* (2006.01)
  *G11B 5/03* (2006.01)
  *G11B 5/39* (2006.01)

(52) U.S. Cl.
  CPC ............... *G11B 5/397* (2013.01); *G11B 5/03* (2013.01); *G11B 2005/0018* (2013.01)

(58) Field of Classification Search
  CPC ... G11B 5/00; G11B 27/36; G11B 2005/0021; G11B 11/1051; G11B 11/10533; G11B 5/54
  USPC .......................................................... 369/59
  See application file for complete search history.

(56) References Cited

U.S. PATENT DOCUMENTS

| | | | |
|---|---|---|---|
| 6,067,200 A | 5/2000 | Ohba et al. | |
| 6,225,802 B1 | 5/2001 | Ramalho et al. | |
| 6,731,448 B2 | 5/2004 | Briskin et al. | |
| 7,630,159 B2 | 12/2009 | O'Brien et al. | |
| 7,804,657 B1 | 9/2010 | Hogg et al. | |
| 8,107,181 B2 | 1/2012 | Tretter | |
| 8,797,667 B1 * | 8/2014 | Barlow | G11B 5/6076 360/75 |

FOREIGN PATENT DOCUMENTS

WO  1996010192 A1  4/1996

OTHER PUBLICATIONS

Siritaratiwa et al.,"A study of noise effects due to the diode protection for shield resistance measurement of GMR recording heads", Research Gate, IEEE, Nov. 2005, 4 pp.

\* cited by examiner

*Primary Examiner* — Nabil Z Hindi
(74) *Attorney, Agent, or Firm* — KONRAD, RAYNES, DAVDA & VICTOR LLP; William K. Konrad

(57) ABSTRACT

A computer program product, system, and method are provided for direct resistance measurement of a magnetoresistive (MR) head of a storage drive in a storage system. In one embodiment, a voltage difference across the MR reader head is measured directly by applying an AC current to the MR head to generate an AC voltage across the MR head that can propagate through filter capacitors and be measured. In one embodiment, the voltage difference is amplified and the peak-to-peak voltage at the output of the amplifier is captured. Similarly, a reference voltage difference across a reference resistance is measured directly by applying a reference AC current to a reference resistance. The resistance of an MR reader head may be calculated directly as a function of the respective voltage differences without including the resistance of any bias resistors biasing the MR head.

20 Claims, 6 Drawing Sheets

DIRECT MEASUREMENT OF MAGNETORESISTIVE HEAD RESISTANCE IN A STORAGE SYSTEM

BACKGROUND OF THE INVENTION

1. Field of the Invention

The present invention relates to a computer program product, system, and method for direct resistance measurement of magnetoresistive heads in a storage system.

2. Description of the Related Art

A storage system typically includes one or more storage controllers which control the storage drives which provide the actual storage capacity. User applications typically run on one or more hosts which communicate with the storage controllers through one or more storage area networks (SANs) in enterprise storage systems. A magnetic data storage device such as a magnetic tape drive, hard disk drive, and the like often employs a magnetoresistive (MR) head to record data to or read data from a magnetic media such as a magnetic tape, a hard disk, and the like. The magnetic data storage device typically employs at least one MR head to read data and at least one head to write data. The magnetic data storage device may also employ an MR head as a servo to control positioning of the MR heads and the media relative to each other. MR heads may employ various magnetoresistive technologies including Giant Magnetoresistive ("GMR"), Tunneling Magnetoresistive ("TMR"), and Magnetoresistive ("MR") reader head resistance.

A write head writes data to the magnetic media by creating a magnetic field in response to an electronic signal. The magnetic field varies in response to changes in the strength and polarity of the electronic signal. In addition, the varying magnetic field modifies the magnetic polarization of the magnetic media in a region of the magnetic media adjacent to the write head. Thus by encoding data as changes of strength and polarity in the electronic signal, the write head encodes the data as magnetic polarities on the magnetic media as the write head moves relative to the magnetic media.

A read MR head reads data from the magnetic media by creating an electronic signal as induced by the change of magnetic polarities between the various regions of the magnetic media as the read MR head moves relative to magnetic media. Because the data was written to the magnetic media as changes in magnetic polarity, the electronic signal from the read MR head may be decoded to retrieve the data from the magnetic media.

The performance of the MR head is highly sensitive to the electrical characteristics of the MR head. For example, the electrical resistance of the MR head may be measured by the manufacturer or the user of the MR head, or both. In one prior technique, the resistance of the MR head has been measured by applying a known DC reference current to the MR head, measuring a DC voltage across just the MR head, and calculating the resistance from the known reference current and the voltage using Ohm's law. Unfortunately, the DC reference current used to measure the resistance is often not known with sufficient precision or accuracy, reducing the precision and accuracy of the calculated resistance.

Another approach is to measure the resistance of the MR head indirectly. One known indirect method measures a DC voltage that is generated from a DC reference current applied through a fixed reference resistor string which includes two bias resistors and a reference resistor. The DC voltage generated by passing the DC reference current through the fixed resistor string is compared to a second DC voltage generated by passing a DC current through a second resistor string which includes two bias resistors and the resistance of the MR head tested. If the DC reference current is the same as the second DC current, and if the resistances $R_{bias}$ of the bias resistors and R ref of the reference resistor are known, the resistance $R_{MR}$ of the MR head may be calculated using Ohm's law in equation (0) below as:

$$R_{MR} = \frac{(V_{drop})}{V_{test}} * (R_{bias} + R_{ref} + R_{bias}) - (2 * R_{bias}) \qquad (0)$$

where $V_{test}$ is the measured DC voltage generated by passing the known DC reference current through the fixed resistor string of two known bias resistors and the known reference resistor, $V_{drop}$ is the DC voltage generated by passing the known DC current (equal to the known DC reference current) through the resistor string of two known bias resistors and the unknown MR head resistance. Since $V_{drop}$ measures the voltage drop across both the bias resistors and the reader head, the calculation indirectly measures the voltage across the reader head.

SUMMARY

Providing a computer program product, system, and method for direct resistance measurement of resistance of a magnetoresistive (MR) head which in one embodiment, includes, in a first AC mode: measuring a reference voltage across a reference resistance while applying a reference AC current to the reference resistance to generate an AC reference voltage signal across the reference resistance. A second voltage across a magnetoresistive (MR) head is measured while applying a second AC current to the MR head to generate a second AC voltage signal across the MR head. In one embodiment, the second AC current has a known proportionality to the reference AC current. The MR head resistance is calculated as a function of a ratio of the measured second voltage to the measured reference voltage. Other aspects and advantages may be provided, depending upon the particular application.

Figure 2:
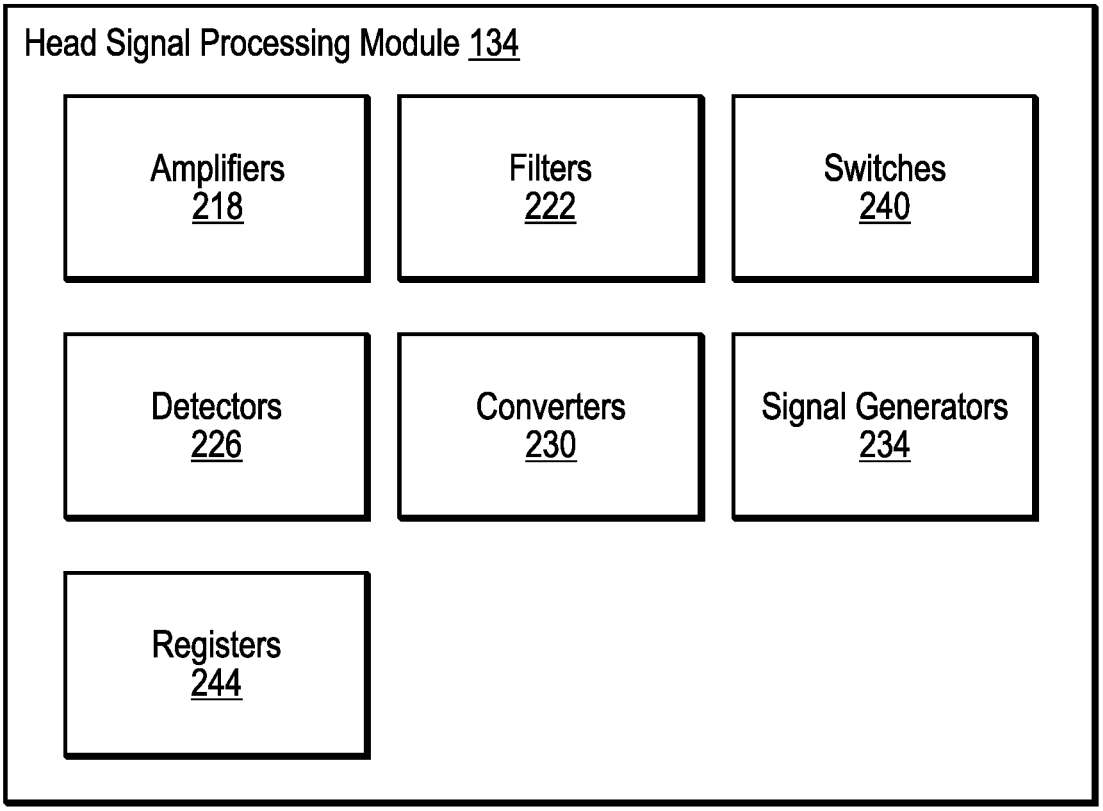
FIG. 2 illustrates an exemplary block diagram of a configurable hardware structure of a head signal processing module in a data storage drive in a computer system in which direct resistance measurement in accordance with the present description is employed.
Figure 5A:
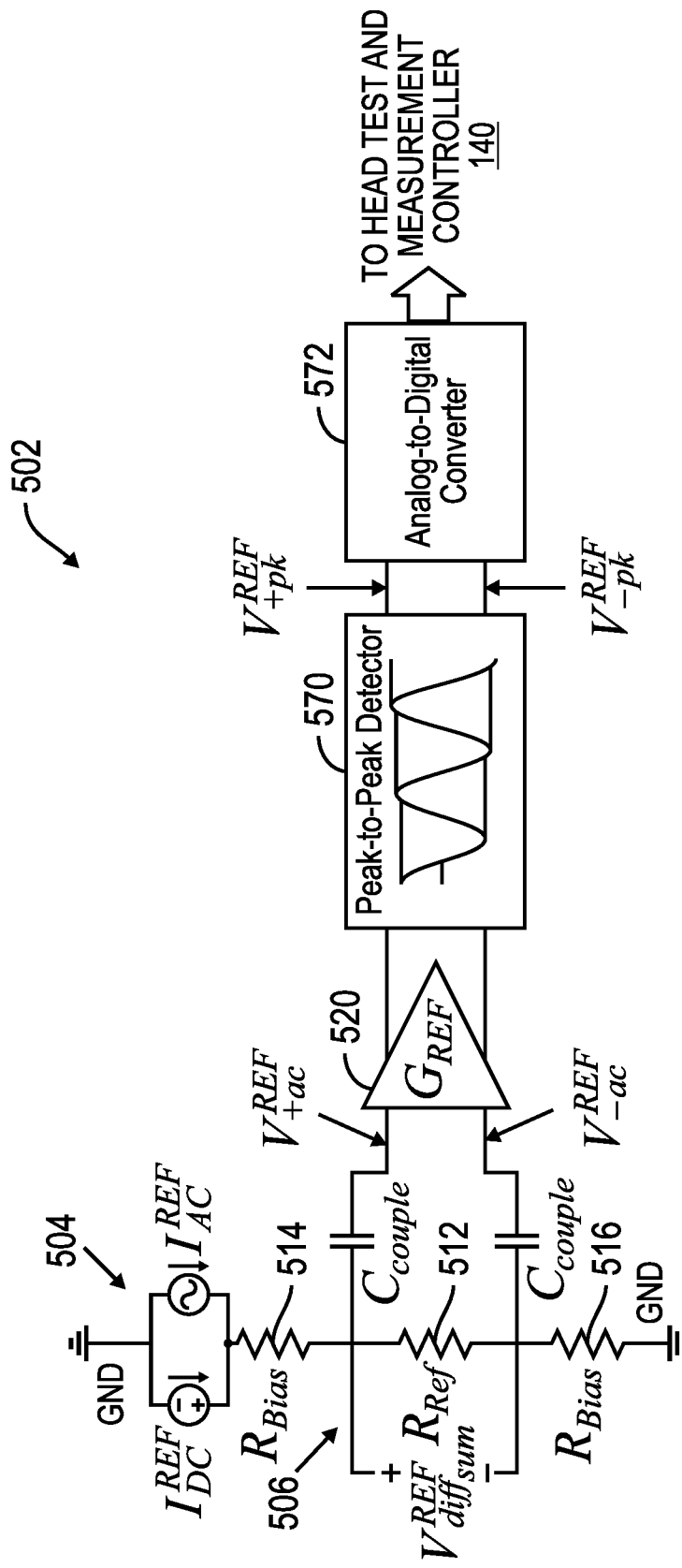
FIG. 5A illustrates an exemplary block diagram of a configuration of the head signal processing module of FIG.
Figure 5B:
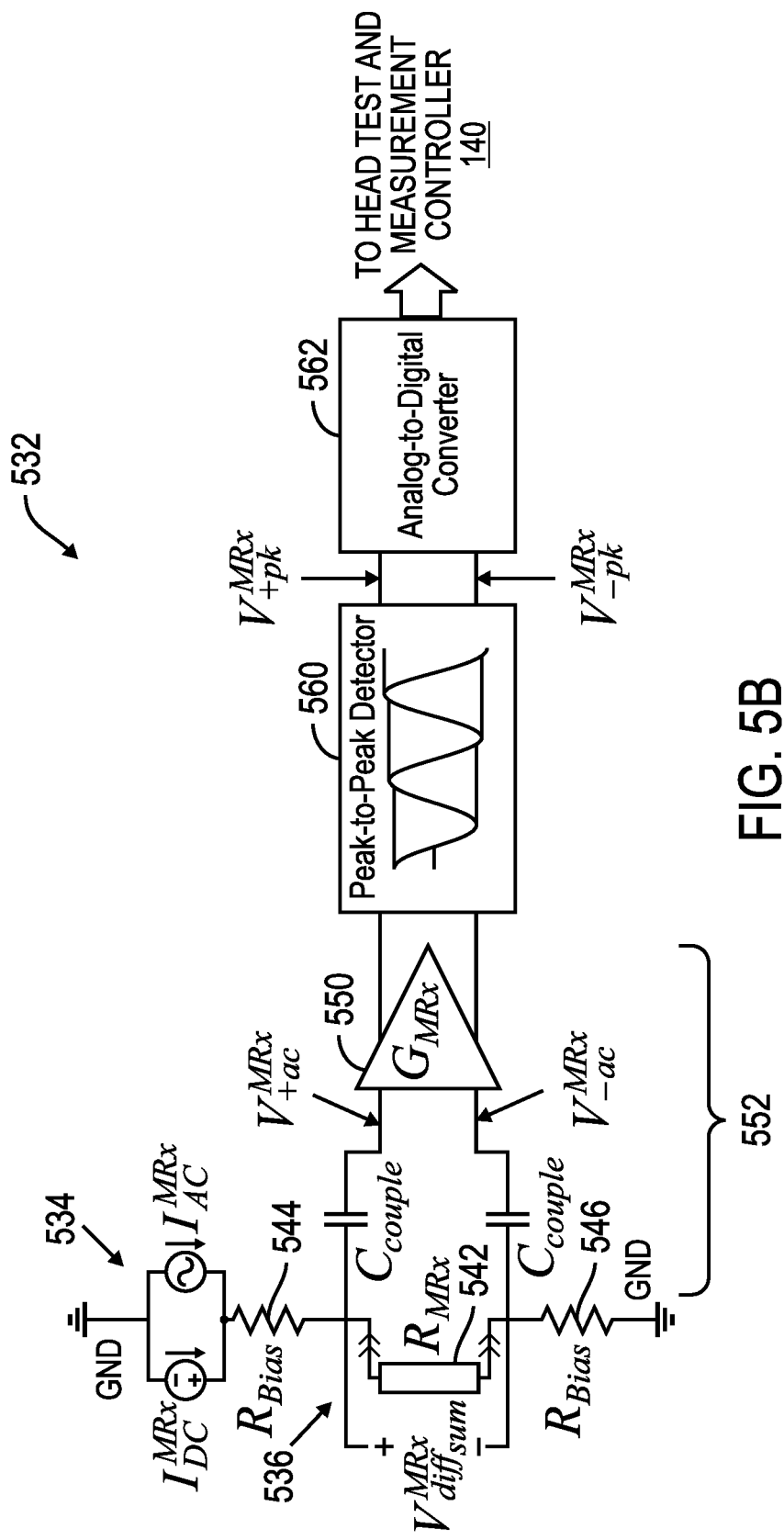
Figure 6:
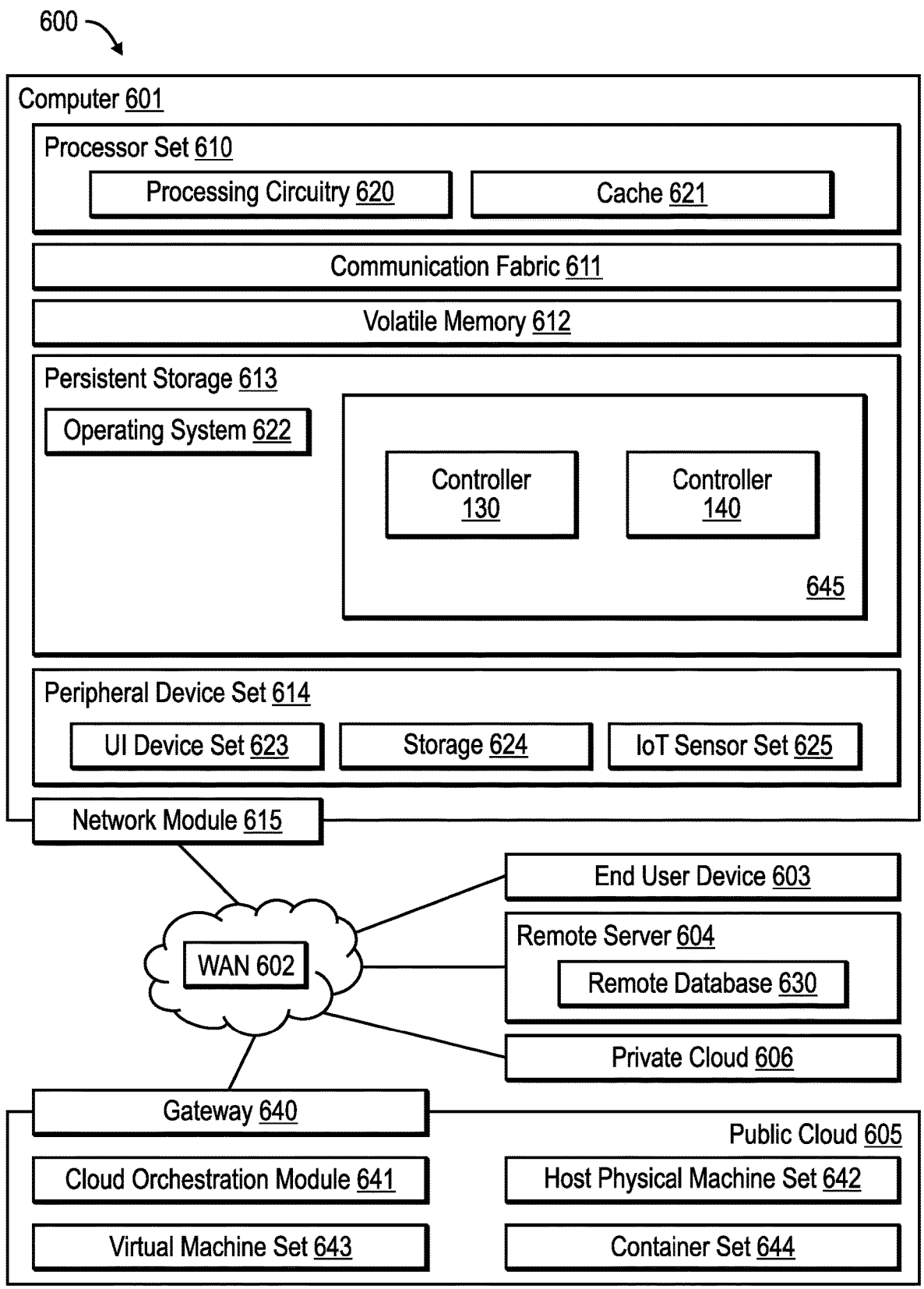

2, in which a portion of the head signal processing module has been configured for a reference measurement channel in which direct resistance measurement in accordance with the present description is employed;

FIG. 5B illustrates an exemplary block diagram of a configuration of the head signal processing module of FIG. 2, in which a portion of the head signal processing module has been configured for an MR head test measurement channel in which direct resistance measurement in accordance with the present description is employed;

FIG. 6 illustrates a computing environment in which the components employing direct resistance measurement in accordance with the present description may be implemented.

DETAILED DESCRIPTION

Described embodiments provide improved computer technology to facilitate accurate resistance measurement for an MR head in a storage drive of a storage system. In one embodiment, the resistance of each MR reader head in a head assembly or module, may be measured directly and independently of bias resistors in the MR head module, to achieve high accuracy in the MR head resistance measurement. Direct resistance measurement in accordance with the present description is applicable to measure head resistance of heads employing various magnetoresistive technologies including Giant Magnetoresistive ("GMR"), Tunneling Magnetoresistive ("TMR"), and Magnetoresistive ("MR") technologies. Thus, as used herein, the term MR head resistance includes various types of magnetoresistive head resistance including Giant Magnetoresistive ("GMR"), Tunneling Magnetoresistive ("TMR"), and Magnetoresistive ("MR") head resistance.

It is appreciated herein that a drawback with the previously described indirect measurement method which measures the resistance of an MR head indirectly, is that the accuracy of the calculation of the resistance of the MR head is typically dependent on tolerance error of the "known" resistances of the bias resistors. For example, in the equation (0) above, there are four bias resistors that will typically have a tolerance error associated with the known resistance of each bias resistor. However calculations which assume nominal resistance values for the bias resistors will as a result have a tolerance error incorporated into the reader head resistance calculation. Moreover, the larger the resistance of the bias resistors, the larger the associated tolerance error typically will be. Thus, if the resistances of the bias resistors of the MR head module are relatively large, particularly as compared to the resistance of the MR head associated with those bias resistors, the resultant decrease in accuracy of the MR head resistance calculation in the indirect approach can be correspondingly large. Accordingly, it is appreciated herein that applicability of the indirect resistance measurement method may be limited to applications having bias resistors of a maximum size of resistance and a minimum size of MR head resistance.

In one aspect of direct resistance measurement in accordance with the present description, the resistance of an MR reader head in a reader heads module, is calculated independently of the resistance values of bias resistors in the reader heads module to achieve high accuracy. For example, calculating the resistance of reader heads independently of bias resistor values removes the need to know the bias resistor values and thus removes error in the calculation due to tolerance error of the bias resistor values.

In this manner, a more direct method for MR reader head resistance measurement and calculation is provided with a resultant increase in accuracy. Moreover, direct resistance measurement in accordance with the present description has increased applicability. For example, direct resistance measurement in accordance with the present description is applicable to a wide variety of MR reader head modules including reader head modules having relatively large bias resistors as compared to the resistance of the MR heads.

In the illustrated embodiment, each read channel of the storage drive 116 has an MR head output stage which includes an amplifier and associated filter capacitors coupled to an MR reader head. It is appreciated herein that the presence of the filter capacitors coupled to the MR head hinders a direct DC current measurement of the resistance of the MR head.

Accordingly, in one aspect of direct resistance measurement of the present disclosure, a voltage difference across the MR reader head is measured directly by applying an AC current to the MR head to generate an AC voltage across the MR head that can propagate through the filter capacitors and be measured. In the illustrated embodiment, a test current provided by a current source includes both an AC current component and a DC current component which biases the MR reader head of a reader channel. This test current will generate AC and DC test voltages that are proportional to the reader head resistance. The AC test voltage will propagate through the filter capacitors into the amplifier channel of the amplifier as an AC difference voltage which is amplified by the amplifier. Thus, the DC test voltage signal is filtered from the AC test voltage signal before the remaining AC test voltage signal is amplified as an AC test difference voltage.

In the illustrated embodiment, a test measurement channel for the reader head channel incorporates the MR head output stage of the reader channel, and includes a peak-to-peak detector at the output stage of the amplifier channel of the amplifier of the MR head output stage. The peak-to-peak detector detects the peak-to-peak voltage of the filtered and amplified AC test difference voltage. Thus, the detector converts the amplified AC test difference voltage into an amplified DC difference voltage that is measured by an analog-to-digital converter (ADC). The digital output of the ADC representing the magnitude of the amplified DC test difference voltage is read for calculating the resistance of the MR reader head directly as explained in greater detail below. This process can be repeated for each MR reader head of the MR head module.

In addition, a similar process is performed for a reference resistance of a reference channel to provide a reference DC difference voltage value. In one aspect of direct resistance measurement for an MR head in accordance with the present description, it is recognized that if the AC current through reference resistance and the AC current through the MR head resistance are equal, and if the amplifier gains of the amplifiers of the reference channel and the test measurement channel are equal, then the resultant peak-to-peak voltages for the reference resistor and the resistance of the MR reader head are proportionally equal to their associated resistances, via Ohm's law. As a result, the resistance of an MR reader head may be calculated directly without including the resistance of the bias resistors as explained below. In the illustrated embodiment, the current sources and amplifiers may be disposed on the same silicon die. As a result, an assumption that AC currents and amplifier gains are equal is facilitated.

Figure 1:
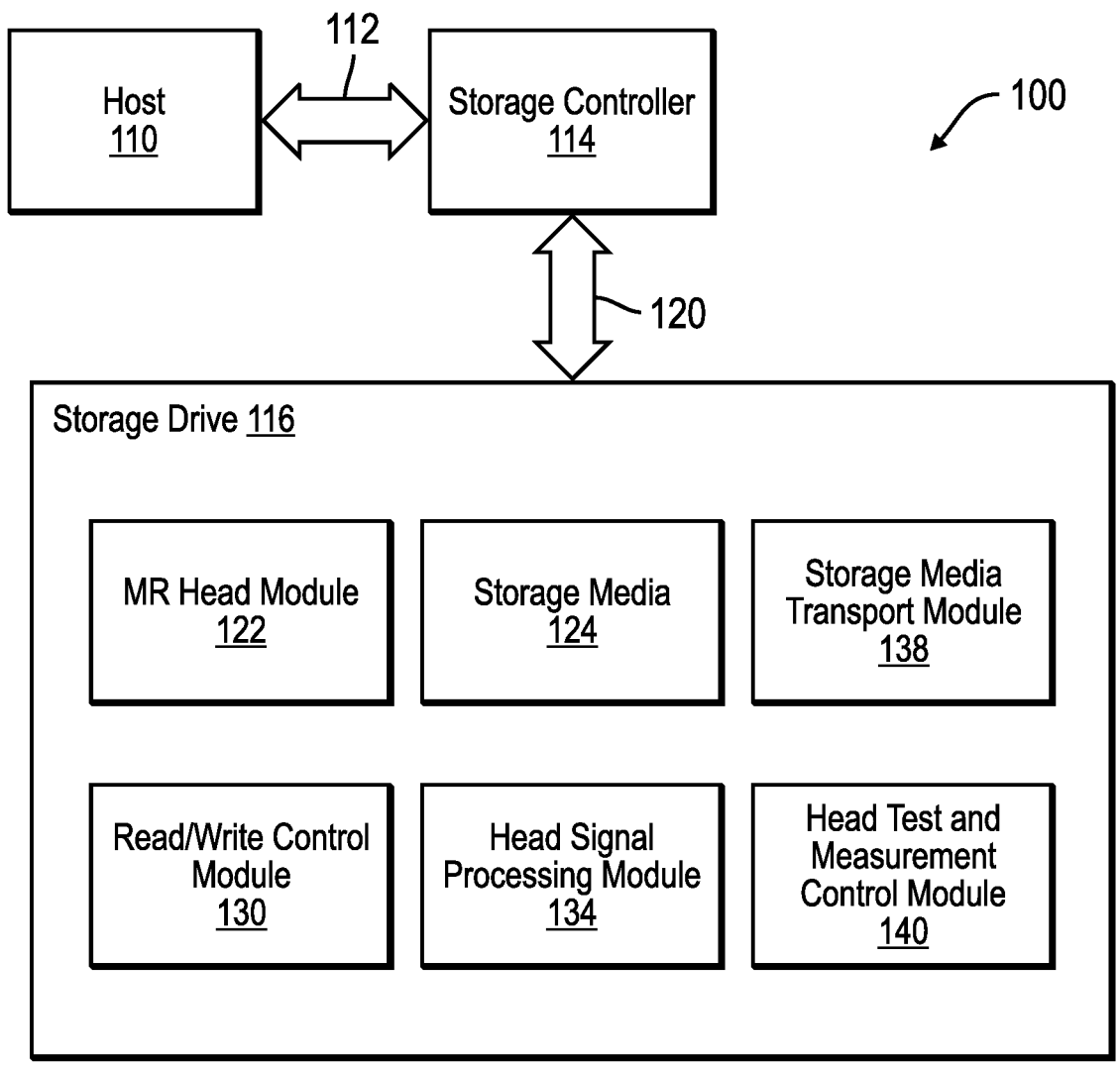
FIG. 1 illustrates a high-level block-diagram representation of an enterprise computer system in which direct resistance measurement in accordance with the present description is employed.

Various aspects of the present disclosure are described below with reference to flowchart illustrations and/or block diagrams of methods, apparatus (system) and computer program products. FIG. 1 is a high-level block-diagram showing a representation of an enterprise computer system 100 in which aspects of an embodiment of direct resistance measurement in accordance with the present description may be realized. Examples of enterprise-wide applications include, without limitation, banking transactions, payroll, warehouse, transportation, and batch jobs. Enterprise computer system 100 of FIG. 1 comprises one or more host data processing systems as represented by a representative host 110, which are communicatively coupled together via a network 112 which may be include a local area network or "LAN", a Storage Area Network (SAN), Intranet, the Internet, Wide Area Network (WAN), peer-to-peer network, wireless network, arbitrated loop network, etc.

Each host 110 is coupled by a network 112 to a storage subsystem which includes one or more data storage controllers 114 which control one or more storage devices or drives 116 via a network 120. A host 110 generates input/output (I/O) operations which read data from or write date to a storage drive 116 via a storage controller 114 controlling the particular storage drive 116.

In the illustrated embodiment, the storage drive 116 is a tape storage drive employing an MR head module which includes multiple MR heads for reading data from and writing data to a tape storage media 124 under the control of a read/write control module or controller 130. For example, the storage drive 116 may be an IBM® Linear Tape Open (LTO) 9 Tape Drive which is modified to employ direct resistance measurement in accordance with the present description. The tape storage media 124 is often housed in a tape cartridge having internal spools upon which the tape is transported. It is appreciated that other types of tape drives and other types of storage drives such as hard disk drives, for example, may employ direct resistance measurement in accordance with the present description.

In one embodiment, each MR write head of the MR head module 122 is associated with an assigned write channel to receive and encode write data on tape magnetic media of the storage media 124. Similarly, each MR read head of the MR head module 122 is associated with an assigned read channel to decode and read data previously written on tape magnetic media. of the storage media 124.

For example, a write MR head of the MR head module 122 writes data to the magnetic media 124 by creating a magnetic field in response to an electronic signal provided by an associated write channel of the head signal processing module 134 controlled by the read/write controller 130. The created magnetic field varies in response to changes in the strength and polarity of the electronic signal. In addition, the varying magnetic field modifies the magnetic polarization of the magnetic media 124 in a region of the magnetic media adjacent to the write head. Thus, by encoding data as changes of strength and polarity in an electronic signal provided through the write channel, the write head encodes the data as magnetic polarities on the magnetic media 124 as the write head moves relative to the magnetic media 124. Relative motion between the write head and the magnetic media 124 is provided by a storage media transport module 138. Thus, in a tape cartridge embodiment, the storage media transport module 138 drives the tape within the cartridge under the control of the read/write controller 130.

Conversely, a read MR head of the MR head module 122 reads data from the magnetic media 124 by creating an electronic signal as induced by the change of magnetic polarities between the various regions of the magnetic media 124 as the read MR head is moved relative to magnetic media 124 by the storage media transport module 138 controlled by the read/write controller 130. The electronic signal induced in the MR read head is sensed by a read channel of the head signal processing module 134 controlled by the read/write controller 130. Because the data was written to the magnetic media 124 as changes in magnetic polarity, the electronic signal sensed from the read MR head may be decoded by the read channel of the head signal processing module 134 and the read/write controller 130 to retrieve the previously written data from the magnetic media 124.

In the illustrated embodiment, MR heads are described as having dedicated read, write or servo functions. However, it is appreciated that systems having MR heads used for combinations of one or more read, write and servo functions, may employ direct resistance measurement in accordance with the present description.

As previously mentioned, performance of an MR head is highly sensitive to the electrical characteristics of the MR head. In one aspect of direct resistance measurements in accordance with the present description, the storage drive 116 includes a head test and measurement control module or controller 140 embedded within the storage drive 116, to provide precise direct resistance measurements for MR heads of the MR head module 122. Thus, the storage drive 116 of the illustrated embodiment is configured for selective multiple modes of operation including a read/write mode in which data is written to or read from the storage media 124, and a head test and measurement mode in which direct resistance measurements are made for MR heads of the MR head module 122. As a result, an MR head may be tested and measured employing direct resistance measurement in accordance with the present description, without removing the MR head from the storage drive or otherwise altering the MR head module 122. It is appreciated that in other embodiments, some or all equipment for direct resistance measurement in accordance with the present description may be provided external to the storage drive 116 such as in a dedicated test and measurement workstation, for example.

In the read/write mode of operation of the storage drive 116, the read/write controller 130 configures and operates the head signal processing module 134 in read or write channels to perform read or write operations as discussed above, to generate and process write signals to an MR head in a write operation or to sense and to process read signals from an MR head in a read operation. Conversely, in a head test and measurement mode of operation, the head test and measurement controller 140 configures and operates channels of the head signal processing module 134 to generate and apply test signals to an MR head and sense resultant measurement signals from an MR head, for direct resistance measurement in accordance with the present description. The head test and measurement controller 140 calculates a direct resistance measurement value for each MR head being tested as a function of the measurement signals sensed by the head signal processing module 134 in the test and measurement mode of operation.

FIG. 2 depicts a more detailed example of the head signal processing module 134 of FIG. 1. In this example, the head signal processing module 134 includes various electrical and electronic components which may be disposed on a circuit board or other substrate and configured in various configurations associated with various modes of operation. In the embodiment of FIG. 2, the head signal processing module 134 includes resistors 214 including bias resistors of an MR head assembly to bias an MR head of the MR head assembly, amplifiers 218 including channel amplifiers to amplify channel signals, filters 222 including channel filters to filter channel signals, detectors 226 including peak-to-peak detectors to detect measurement signals, converters 230 including analog-to-digital converters to convert measurement signals and signal generators 234 including AC and DC current sources to generate test signals. These and other components of the head signal processing module 134 may be selectively interconnected by programmable switches 240 including analog signal multiplexers programmed by the head test and measurement controller 140 (FIG. 1) to configure the head signal processing module 134 for multiple modes of operation including a read/write mode in which data is written to or read from the storage media 124 (FIG. 1), and a head test and measurement mode in which direct resistance measurements in accordance with the present description are made for MR heads of the MR head module 122. For example, the head test and measurement controller 140 can load digital values in input registers of registers 244 to control the switching of analog multiplexers to route analog signals among components of the head test and measurement controller 140 (FIG. 1) to perform direct resistance measurements for MR heads of the MR head module 122 (FIG. 1). Similarly, digital values representing results of direct resistance measurements for MR heads can be loaded by the head signal processing module 134 into output registers of registers 244 and read by the head test and measurement controller 140, for further computations.

Figure 3:
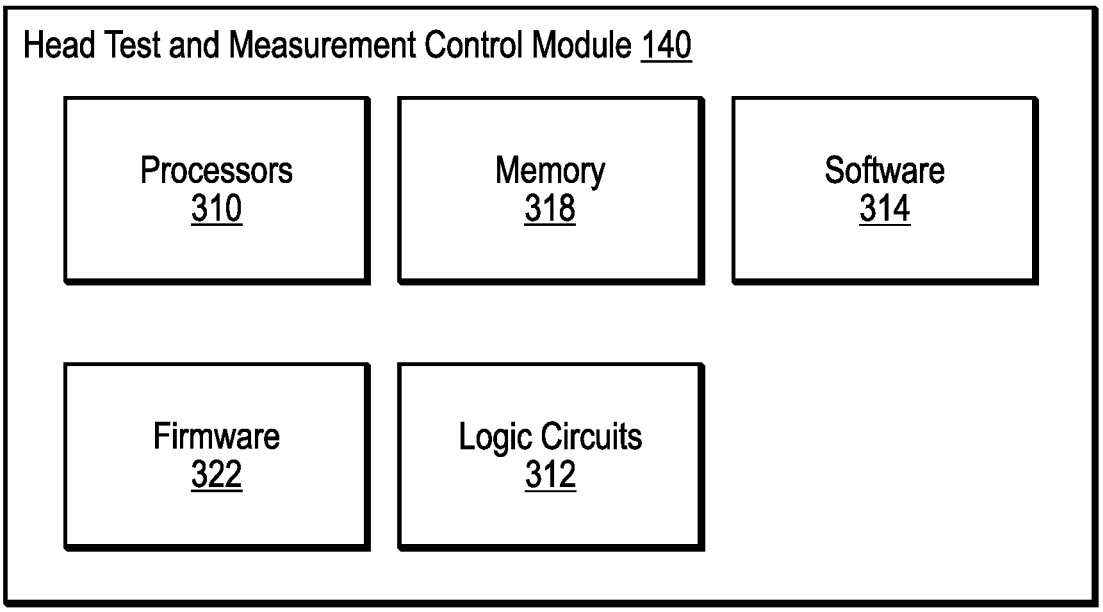
FIG. 3 illustrates an exemplary block diagram of a hardware, firmware and software structure of a head test and measurement controller in a data storage drive in a computer system in which direct resistance measurement in accordance with the present description is employed.

Referring to FIG. 3, the head test and measurement controller 140 includes processors 310 which perform various logic functions including configuration and operation of the head signal processing module 134 in the head test and measurement mode in which direct resistance measurements are made for MR heads of the MR head module 122 in accordance with the present description. Other logic functions of the head test and measurement controller 140 include calculation of values representing direct resistance measurements in accordance with the present description. These logic functions may be performed by one or more of programmed centralized processors such as central processing units (CPUs) and programmed distributed processors such as integrated circuit logic devices 312 such as Application Specific Integrated Circuit (ASIC) devices, for example. Programming of such hardware may be provided by one or more of software 314 and firmware 322 alone or in combination, and stored in a memory 318. In other embodiments, some or all of the logic functions of the controller 140 may be performed by dedicated or hard-wired logic circuitry.

Figure 4:
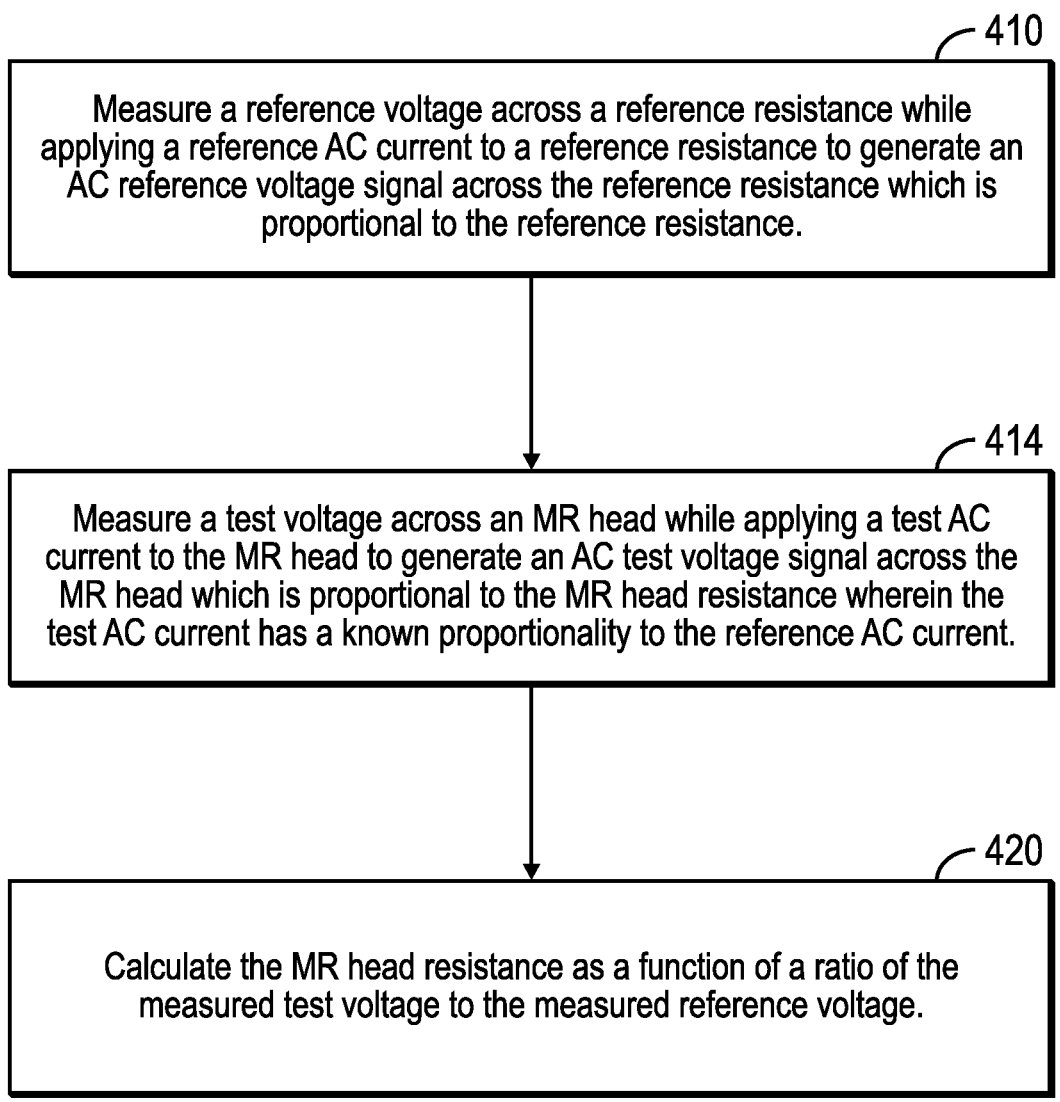
FIG. 4 illustrates an embodiment of operations for direct resistance measurement in accordance with the present description.

FIG. 4 depicts one example of a head test and measurement mode of operations of the head test and measurement controller 140 (FIGS. 1, 3) of a storage drive 116 (FIG. 1) in accordance with one embodiment of the present description. As shown in FIG. 4, the head test and measurement mode of operations of controller 140 (FIG. 2) in this example are represented by blocks 410-420 of FIG. 4, and include three phases, that is, a reference measurement phase represented by block 410, a test measurement phase represented by block 414, and a calculation phase represented by a block 420. It is appreciated that the number and types of phases of operations of a head test and measurement controller 140 (FIGS. 1, 3) of a storage drive in accordance with embodiments of the present description, may vary, depending upon the particular application. Furthermore, operations may be performed in sequences other than those depicted in FIG. 4. For example, operations such as reference and test directed operations may be performed in reverse order or substantially in parallel, depending upon the particular application.

In one embodiment, the resistance measurement operations are performed while the MR heads of the MR head module 122 (FIG. 1) remain installed in the storage drive 116 and thus are available for use in read/write operations in the storage drive 116. Moreover, any need to place external measurement probes on circuitry of the storage drive during resistance test or measurement is obviated by the head signal processing module 134 (FIG. 1) It is appreciated that in other embodiments, MR heads may be removed from the storage drive 116 to perform resistance measurements in accordance with the present description.

In addition, direct resistance measurement for an MR head in accordance with the present disclosure may be fully automated by the head test and measurement control module 140 (FIG. 1) controlling the head signal processing module 134 without substantial operator intervention once the measurement process has been initiated. It is appreciated that in other embodiment, some or all of the measurement operations may be performed manually in which the storage drive 116 receives user inputs from an operator at various stages of the measurement process, through a suitable user interface of the storage drive 116.

In the reference measurement phase represented by block 410 of a head test and measurement mode of operations of the head test and measurement controller 140 (FIGS. 1, 3) of a storage drive 116 (FIG. 1), a reference voltage across a reference resistance is measured while applying a reference AC current to the reference resistance to generate an AC reference voltage signal across the reference resistance which is proportional to the reference resistance. FIG. 5A shows an example of a reference measurement channel 502 of the head signal processing module 134 which includes a current source 504 which provides a reference current $I^{REF}$ having a DC component $I_{DC}^{MRx}$ and an AC component $I_{AC}^{REF}$ through a resistor string 506. The resistor string 506 includes a reference resistor 512 having a reference resistance $R_{Ref}$ and series-connected bias resistors 514, 516, each having a bias resistance $R_{Bias}$, The reference measurement channel 502 of FIG. 5A further includes an amplifier 520 having a gain represented by $G_{Ref}$ and a pair of inputs, each of which is coupled by an associated filter capacitor $C_{couple}$ to nodes of the resistor string 511 at each end of the reference resistance $R_{Ref}$.

In the test measurement phase represented by block 414 (FIG. 4) of the head test and measurement mode of operations of the head test and measurement controller 140 (FIGS. 1, 3) of a storage drive 116 (FIG. 1), a test voltage across an MR head is measured while applying a test AC current to the MR head to generate an AC test voltage signal across the MR head which is proportional to the resistance of the MR head. In the illustrated embodiment, the test AC current has a known proportionality (such as equal, for example) to the reference AC current. FIG. 5B shows an example of a test measurement channel 532 of the head signal processing module 134 which like the reference measurement channel 502 (FIG. 5A), includes a current source 534 which provides an MR head test current $I^{MRx}$ having a DC component $I_{DC}^{MRx}$ and an AC component $I_{AC}^{MRx}$ through a resistor string 536. The resistor string 536 includes an MR head 542 having an unknown head resistance $R_{MRx}$ and series-connected bias resistors 544, 546, each having a bias resistance $R_{Bias}$, The test measurement channel 532 of FIG. 5B further includes an amplifier 550 having a gain represented by $G_{MRxf}$ and a pair of inputs, each of which is coupled by an associated filter capacitor $C_{couple}$ to nodes of the resistor string 536 at each end of the MR head resistance $R_{MRx}$. The filter capacitors $C_{couple}$ and the amplifier 550 provide an MR head output stage 552 coupled to the MR head 542.

In the calculation phase represented by block 420 (FIG. 4) of the head test and measurement mode of operations of the head test and measurement controller 140 (FIGS. 1, 3) of a storage drive 116 (FIG. 1), the MR head resistance is calculated as a function of a ratio of the measured MR head test voltage to the measured reference voltage. In one embodiment of direct resistance measurement in accordance with the present description, the resistance of an MR reader head is calculated directly without including the bias resistors in the calculation. More specifically, the voltage difference across the MR reader head is measured directly instead of measuring the voltage difference across the entire resistor string.

In the illustrated embodiment, each read channel (represented by the variable {X}) of the head signal processing module 134 shares an MR head output stage such as the output stage 552 of the associated test measurement channel 532 for the particular MR head. Thus, the read channel {X} for the MR head 542 shares the MR head output stage 552 which includes the amplifier 550 and associated filter capacitors $C_{couple}$ coupled to the MR head 542. It is appreciated herein that the presence of the filter capacitors $C_{couple}$ coupled to the MR head 542 hinders a direct DC current measurement of the resistance of the MR head 542.

Accordingly, in one aspect of direct resistance measurement of the present disclosure, the voltage difference across the MR reader head is measured directly by applying an AC current to the MR head to generate an AC voltage across the MR head. The generated AC voltage signal is proportional to the resistance of the MR head and can propagate through the filter capacitors $C_{couple}$ and be measured. In the illustrated embodiment, an MR head test current $I_{test}^{Mrx}$ provided by the current source 534 includes both an AC current $I_{AC}^{MRx}$ and a DC current $I_{DC}^{MRx}$ which biases the MR reader head 542 of a reader channel {X} and the test measurement channel 532. This MR head test current will generate AC and DC test voltages that are proportional to the reader head resistance $R_{MRx}$. The AC test voltage will propagate through the filter capacitors C couple into the amplifier channel of the amplifier 550 where the difference is measured as an AC difference voltage which is amplified by the amplifier 550. Thus, the MR head DC test voltage signal is filtered from the MR head AC test voltage signal before amplifying the remaining MR head AC test voltage signal.

A peak-to-peak detector 560 at the output stage of the amplifier channel of the amplifier 550 measures the peak-to-peak voltage of the filtered and amplified MR head AC test voltage signal. Thus, the detector 560 converts the amplified AC difference voltage into an amplified DC difference voltage that is measured by an analog-to-digital converter (ADC) such as a slow speed ADC 562, for example. The digital output of the ADC representing the magnitude of the amplified DC difference voltage is read by the head test and measurement controller 140 (FIGS. 1, 3) for calculating the resistance of the MR reader head 542 directly as explained below. This test and measurement process can be repeated for each MR reader head of the MR head module 122 (FIG. 1). When not testing or measuring an MR head such as the MR head 542, for example, the detector 560 and converter 562 of the test measurement channel 532 may be powered down so as to not interfere with the read operations of the MR head output stage 552 coupled to the MR head 542.

In addition, a similar process is performed for the reference resistance 512 (FIG. 5A). Thus, the voltage difference across the reference resistor is measured directly by applying an AC reference current to the reference resistor to generate an AC reference voltage across the reference resistor. The generated AC reference voltage is proportional to the reference resistor resistance and can propagate through the filter capacitors $C_{couple}$ and be measured. In the illustrated embodiment, a reference current $I^{REF}$ provided by the current source 504 includes both an AC current $I_{AC}^{REF}$ and a DC current $I_{DC}^{REF}$ which biases the reference resistor 512 of a reference channel 502. This reference current will generate AC and DC reference voltages that are proportional to the reference resistance $R_{REF}$. The AC reference voltage will propagate through the filter capacitors $C_{couple}$ into the amplifier channel of the amplifier 520 where the difference is measured as an AC difference voltage which is amplified by the amplifier 520. The DC reference voltage signal is thus filtered from the AC reference voltage signal before amplifying the AC reference voltage signal. A peak-to-peak detector 570 at the output stage of the amplifier channel of the amplifier 520 measures the peak-to-peak voltage of the filtered and amplified AC reference voltage signal. In this manner, the detector 570 converts the amplified AC difference voltage into an amplified DC difference voltage that is measured by an analog-to-digital converter (ADC) such as a slow speed ADC 572, for example. The digital output of the ADC representing the magnitude of the amplified DC difference voltage is read by the head test and measurement controller 140 (FIGS. 1, 3) for calculating the resistance of the MR reader head 542 directly as explained in greater detail below.

In one aspect of direct resistance measurement for an MR head in accordance with the present description, it is recognized that if the AC current through reference resistance $R_{Ref}$ and the MR head resistance $R_{MRx}$ and the amplified gain, $G_{Ref}$ of the amplifier 520 and the amplified gain $G_{MRx}$, of the amplifier 550, are equal between the reference channel 502 and the test measurement channel 532 for the reader head channel {X}, then the peak-to-peak voltages for the reference resistor 512 and the resistance of the MR reader head 542 are proportionally equal to their associated resistances, $R_{Ref}$ and $R_{MRx}$ via Ohm's law. As a result, the resistance $R_{MRx}$ of an MR reader head may be calculated directly without including the resistance of the bias resistors as explained below.

As noted above, the reference measurement channel 502 of FIG. 5A includes a current source 504 which provides a reference current $I^{REF}$ having a DC component $I_{DC}^{REF}$ and an AC component $I_{AC}^{REF}$ such that $$I^{REF} = I_{DC}^{REF} + I_{AC}^{REF}. \quad (1)$$

The reference current $I^{REF}$ is directed through the resistor string 506 of the reference resistor 512 and series-connected bias resistors 514, 516, each having a bias resistance $R_{Bias}$, to generate a reference voltage $V_{diff_{sum}}^{REF}$ as:

$$V_{diff_{sum}}^{REF} = I^{REF} * R_{Ref} \quad (2)$$

across the reference resistance $R_{Ref}$. The reference voltage $V_{diff_{sum}}^{REF}$ across the reference resistance $R_{Ref}$ has both a DC component $V_{diff_{DC}}^{REF}$ and an AC component $V_{diff_{AC}}^{REF}$ as:

$$V_{diff_{sum}}^{REF} = (V_{diff_{DC}}^{REF} + V_{diff_{AC}}^{ref}) = (I_{DC}^{REF} + I_{AC}^{REF}) * R_{Ref} \quad (3)$$

The filter capacitors $C_{couple}$ block DC signals from, and pass AC signals through to, the inputs of the amplifier 520 such that:

$$(+V_{diff_{ac}}^{REF}) = (+I_{AC}^{REF}) * R_{Ref} \quad (4)$$

which may be simplified as:

$$V_{diff_{AC}}^{REF} = I_{AC}^{REF} * R_{Ref} \quad (5)$$

The filtered voltage signals at the inputs of the amplifier 520 may be represented as $V_{+ac}^{Ref}$ and $V_{-ac}^{Ref}$, respectively. Thus, the AC reference voltage $V_{diff_{AC}}^{REF}$ may be represented as:

$$V_{diff_{AC}}^{REF} = (V_{+ac}^{Ref} - V_{-ac}^{Ref}) = I_{AC}^{REF} * R_{Ref}. \quad (6)$$

The filtered voltage signals $V_{+ac}^{Ref}$ and $V_{-ac}^{Ref}$ at the respective inputs of the amplifier 520 and representing the AC reference voltage $V_{diff_{AC}}^{REF}$ are amplified by the amplifier 520 having a gain $G_{Ref}$. The general formula for the operation of an open loop amplifier such as the amplifier 520 is $$V_{out} = G*V_{in} \rightarrow (V_{out}^+ - V_{out}^-) = G*(V_{in}^+ - V_{in}^-) \quad (7)$$

Substituting the terms of equation (6) for the terms of equation (7) provides:

$$V_{pkpk}^{Ref} = G_{Ref} * V_{diff_{AC}}^{Ref} \rightarrow (V_{+pk}^{Ref} - V_{-pk}^{Ref} = G_{Ref} * \\ (V_{+ac}^{Ref} - V_{-ac}^{Ref}) = G_{Ref} * I_{AC}^{REF} * R_{Ref} \quad (8)$$

where $V_{out} = V_{pkpk}^{Ref}$, $G = G_{Ref}$, $V_{in} = V_{diff_{AC}}^{REF}$ and $(V_{out}^+ - V_{out}^-) = (V_{+pk}^{Ref} - V_{-pk}^{Ref})$.

The peak-to-peak detector 570 captures the maximum and minimum AC voltages $V_{+pk}^{Ref}$ and $V_{-pk}^{Ref}$ which are converted to digital values by the ADC 572 and read by the head test and measurement controller 140.

The reference resistance RRef may be solved for as follows:

$$R_{Ref} = \frac{\left(V_{+ac}^{Ref} - V_{-ac}^{Ref}\right)}{G_{Ref} * I_{AC}^{REF}} \quad (9)$$

Turning to FIG. 5B, the test and measurement channel 532 includes a current source 534 which provides an MR head test current $I^{MRx}$ having a DC component $I_{DC}^{MRx}$ and an AC component $I_{AC}^{MRx}$ such that $$I^{MRx} = I_{DC}^{MRx} + I_{AC}^{MRx}. \quad (10)$$

The MR head test current $I^{MRx}$ is directed through the resistor string 536 of the resistance $R_{MRx}$ of the MR head 542 and series-connected bias resistors 544, 546, each having a bias resistance $R_{Bias}$, to generate an MR head test voltage $V_{diff_{sum}}^{MRx}$ as:

$$V_{diff_{sum}}^{MRx} = I^{MRx} * R_{MRx} \quad (11)$$

across the MR head resistance $R_{MRx}$. The MR head test voltage $V_{diff_{sum}}^{MRx}$ across the head resistance $R_{MRx}$ has both a DC component $V_{diff_{DC}}^{MRx}$ and an AC component $V_{diff_{AC}}^{MRx}$ as:

$$V_{diff_{sum}}^{MRx} = (V_{diff_{DC}}^{MRx} + V_{diff_{AC}}^{MRx} = (I_{DC}^{MRx} + I_{AC}^{MRx}) * R_{MRx} \quad (12)$$

The filter capacitors $C_{couple}$ block DC signals from, and pass AC signals through to, the inputs of the amplifier 550 such that:

$$(+V_{diff_{ac}}^{MRx}) = (+I_{AC}^{MRx}) * R_{MRx} \quad (13)$$

which may be simplified as:

$$V_{diff_{AC}}^{MRx} = I_{AC}^{MRx} * R_{MRx} \quad (14)$$

The voltage signals at the inputs of the amplifier 550 may be represented as $V_{+ac}^{MRx}$ and $V_{-ac}^{MRx}$ respectively. Thus, the MR head test AC voltage $V_{diff_{AC}}^{MRx}$ may be represented as:

$$V_{diff_{AC}}^{MRx} = (V_{+ac}^{MRx} - V_{-ac}^{MRx}) = I_{AC}^{MRx} * R_{MRx}. \quad (15)$$

The voltage signals $V_{+ac}^{MRx}$ and $V_{-ac}^{MRx}$ at the respective inputs of the amplifier 550 and representing the MR head test AC voltage $V_{diff_{AC}}^{MRx}$ are amplified by the amplifier 550 having a gain $G_{MRx}$. The general formula for the operation of an open loop amplifier such as the amplifier 550 is $$V_{out} = G*V_{in} \rightarrow (V_{out}^+ - V_{out}^-) = G*(V_{in}^+ - V_{in}^-) \quad (16)$$

Substituting the terms of equation (15) for the terms of equation (16) provides:

$$V_{pkpk}^{MRx} = G_{MRx} * V_{diff_{AC}}^{MRx} \rightarrow (V_{+pk}^{MRx} - \\ V_{-pk}^{MRx} = G_{MRx} * (V_{+ac}^{MRx} - V_{-ac}^{MRx}) = \\ G_{MRx} * I_{AC}^{MRx} * R_{MRx} \quad (17)$$

where $V_{out} = V_{pkpk}^{MRx}$, $G = G_{MRx}$, $V_{in} = V_{diff_{AC}}^{MRx}$ and $(V_{out}^+ - V_{out}^-) = (V_{+pk}^{MRx} - V_{-pk}^{MRx})$.

The peak-to-peak detector 562 captures the maximum and minimum AC voltages $V_{+pk}^{MRx}$ and $V_{-pk}^{MRx}$ which are converted to digital values by the ADC 562 and read by the head test and measurement controller 140. The MR head resistance $R_{MRx}$ may be solved for as follows:

$$R_{MRx} = \frac{\left(V_{+ac}^{MRx} - V_{-ac}^{MRx}\right)}{G_{MRx} * I_{Ac}^{MRx}} \quad (18)$$

It is seen from the above that equation (18) provides the MR head resistance $R_{MRx}$ and equation (9) provides the reference resistance $R_{Ref}$. A ratio or quotient of these two equations provides:

$$\frac{R_{RMx}}{R_{Ref}} = \frac{\frac{\left(V_{+ac}^{MRx} - V_{-ac}^{MRx}\right)}{G_{MRx} * I_{AC}^{MRx}}}{\frac{\left(V_{+ac}^{Ref} - V_{-ac}^{Ref}\right)}{G_{Ref} * I_{AC}^{REF}}} \quad (19)$$

If $I_{AC}^{Ref} = I_{AC}^{MRx}$ and $G_{Ref} = G_{MRx}$, then;

$$\frac{R_{RMf}}{R_{Ref}} = \frac{\left(V_{+ac}^{MRx} - V_{-ac}^{MRx}\right)}{\left(V_{+ac}^{Ref} - V_{-ac}^{Ref}\right)} \rightarrow R_{MRx} = \frac{\left(V_{+ac}^{MRx} - V_{-ac}^{MRx}\right)}{\left(V_{+ac}^{Ref} - V_{-ac}^{Ref}\right)} * R_{Ref} \quad (20)$$

An inspection of equation (20) above indicates that the calculation of the MR head resistance is not dependent on the values of the bias resistors 514, 516 (FIG. 5A) and the bias resistors 544 and 546 (FIG. 5B). Instead, the MR head resistance is calculated as a function of a ratio of the measured voltage across the MR head to the measured reference voltage Thus, the resistance of each MR reader head in a head assembly or module, may be measured directly and independently of bias resistors in the MR head module, to achieve high accuracy in the MR head resistance measurement.

In the illustrated embodiment, current sources and amplifiers of the head signal processing module 134 (FIG. 1) may be disposed on the same silicon die. As a result, an assumption that AC currents $I_{AC}^{Ref}$, $I_{AC}^{MRx}$ are equal and amplifier gains $G_{Ref}$, $G_{MRx}$ are equal, is facilitated. It is appreciated that the resistance of each MR reader head in a head assembly or module, may be measured directly and independently of bias resistors in the MR head module, using other known proportionalities of the current sources or the amplifier gains.

As noted above, in one aspect of direct resistance measurement of the present disclosure, a voltage difference across the MR reader head is measured directly by applying an AC current to the MR head to generate an AC voltage across the MR head that can propagate through the filter capacitors and be measured. Application of an AC current in this manner is referred to herein as an AC mode of the head test and measurement controller 140, (FIGS. 1, 3). Thus, in the AC mode, a voltage difference across the MR reader head is measured directly by applying an AC current to the MR head to generate an AC voltage across the MR head that can propagate through the filter capacitors and be measured. Use of the AC mode may have particular utility in applications in which use of the prior indirect resistance measurement method may not be suitable because bias resistors exceed a maximum size of resistance or the MR head resistance does not meet a minimum size suitable for the prior indirect resistance measurement method.

In another aspect of resistance measurement of the present disclosure, the storage drive 116 may have a selectable second test and measurement mode, referred to herein as a DC mode, for performing an indirect resistance measurement using for example, known indirect resistance measurement techniques. Thus, a DC mode for indirect resistance measurement may be selected instead of the AC mode for direct resistance measurements, depending upon the particular application. For example, it is appreciated herein that applicability of a DC mode for an indirect resistance measurement method may be suitable for applications having bias resistors limited to a maximum size of resistance and an MR head resistance limited to a minimum size.

In the illustrated embodiment, the head test and measurement controller (FIGS. 1, 3) may be programmed for, and the head signal processing module 134 (FIG. 2) may be configured for, indirect resistance measurement operations to measure the resistance of an MR reader head indirectly. These operations may include measuring a DC reference voltage $V_{test}$ across a reference resistance string assembly which includes the reference resistance and two bias resistors coupled in series with the reference resistance. A reference DC current is supplied to the reference resistance assembly to generate the DC reference voltage signal across the reference resistance assembly.

In addition, a DC voltage $V_{drop}$ across an MR head assembly which includes the MR head and two bias resistors coupled in series with the MR head, is measured while applying a DC current to the MR head assembly to generate the DC voltage signal $V_{drop}$ across the MR head assembly. In the indirect resistance measurement method, the DC current through the MR head assembly has a known proportionality (such as equal, for example) to the reference DC current. If so, the MR head resistance of the MR head assembly resistance may be calculated indirectly as a function of a ratio of the measured MR head assembly DC voltage to the measured DC reference voltage. In the illustrated embodiment, if the DC reference current is the same as the MR head assembly DC current, and the resistances $R_{bias}$ of the bias resistors and R ref of the reference resistor are known, the resistance $R_{MR}$ of the MR head may be calculated using Ohm's law in known equation (21) below as:

$$R_{MR} = \frac{(V_{drop})}{V_{test}} * (R_{bias} + R_{ref} + R_{bias}) - (2 * R_{bias}) \quad (21)$$

where $V_{test}$ is the measured DC voltage generated by passing the known DC reference current through the fixed resistor string of two known bias resistors and the known reference resistor, and where $V_{drop}$ is the DC voltage generated by passing the known DC current (equal to the known DC reference current) through the resistor string of two known bias resistors and the unknown MR head resistance reference resistor. Since $V_{drop}$ measures the voltage drop across both the bias resistors and the reader head, the calculation indirectly measures the voltage and hence the resistance across the reader head.

In this example, components of the head signal processing module 134 as represented by the components 214, 218, 222, 226, 230, 234, 240, and 244 (FIG. 2), have been selectively interconnected by programmable switches 240 (FIG. 2) including analog signal multiplexers programmed by the head test and measurement controller 140 (FIG. 1), to configure the head signal processing module 134 to form the reference measurement channel 502 and the test measurement channel 532. It is appreciated that in other embodiments, some or all portions of the measurement channels 502, 532 may be provided as one or more dedicated, hard-wired circuits, for example.

Moreover, the configurations of the components of FIGS. 5A and 5B are shown for purposes of explanation. It is appreciated that other configurations including a greater or fewer number of bias resistors, capacitors, amplifiers and detectors and converters may be employed, depending upon the particular application.

One or more of the controllers 130 and 140 (FIG. 1) of the storage drive 116 may be implemented as program modes which may comprise routines, programs, objects, components, logic, data structures, and so on that perform particular tasks or implement particular abstract data types. The program components and hardware devices of the storage drive 116 of FIG. 1 may be implemented in one or more computer systems, where if they are implemented in multiple computer systems, then the computer systems may communicate over a network.

Program components of one or more of the controllers 130 and 140 (FIG. 1) may be accessed by a processor from memory to execute. Alternatively, some or all of the controllers 130 and 140 (FIG. 1) may be implemented in separate hardware devices, such as Application Specific Integrated Circuit (ASIC) hardware devices.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 6 depicts a computing environment 600 which contains an example of an environment for the execution of at least some of the computer code involved in performing the inventive methods, including direct resistance measurement in accordance with the present description. In addition to block 601, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 601, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. For instance, the computer 601 may comprise the storage drive 116 (FIG. 1), or the storage controller 114 which controls the storage drive 116, or the host 110, alone or in combination. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface-type operating systems that employ a kernel. The direct resistance measurement components 645 typically includes at least some of the computer code involved in performing the inventive methods, including program components of the controller components 130, 140 (FIG. 1) of the storage drive 116.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601) and may take any of the forms discussed above in connection with computer 601. EUD 603, which may include the components of a host 210, 220, 225 (FIG. 2) or a client data processing systems 104A, 104B . . . 104N (FIG. 1B), or a storage controller 204 (FIG. 2), typically sends and receives helpful and useful data which would typically be communicated through network module 615 of computer 601 through WAN 602 to EUD 603. In this way, EUD 603 can display, or otherwise present, useful data to be stored or read. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 may provide for the execution of at least some of the computer code involved in performing the inventive methods, including direct resistance measurement using donor storage pools to supplement storage capacity of recipient storage pools.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for measuring resistance of a magnetoresistive (MR) head, wherein the computer program product comprises a computer readable storage medium having program instructions embodied therewith, the program instructions executable by a processor to cause operations, the operations comprising:
   in a first AC mode:
   measuring a reference voltage across a reference resistance while applying a reference AC current to the reference resistance to generate an AC reference voltage signal across the reference resistance;
   measuring a second voltage across an MR head while applying a second AC current to the MR head to generate a second AC voltage signal across the MR head wherein the second AC current has a known proportionality to the reference AC current; and
   calculating the MR head resistance as a function of a ratio of the measured second voltage to the measured reference voltage.

2. The computer program product of claim 1 wherein the measuring the second voltage across the MR head is performed while the MR head is installed in a storage drive for read/write operations in the storage drive.

3. The computer program product of claim 1 wherein measuring the reference voltage includes amplifying the generated AC reference voltage signal and measuring peak-to-peak voltage of the amplified AC reference voltage signal; and
   wherein measuring the second voltage includes amplifying the generated second AC voltage signal and measuring peak-to-peak voltage of the amplified second AC voltage signal.

4. The computer program product of claim 3 wherein measuring the reference voltage includes applying a reference DC current to the reference resistance to generate a DC reference voltage signal across the reference resistance, and filtering the DC reference voltage signal from the AC reference voltage signal before amplifying the AC reference voltage signal; and
   wherein measuring the second voltage includes applying a second DC current to the MR head to generate a second DC voltage signal across the MR head, and filtering the second DC voltage signal from the second AC voltage signal before amplifying the second AC voltage signal.

5. The computer program product of claim 4 wherein measuring the reference voltage across the reference resistance includes measuring peak-to-peak voltage of the filtered and amplified AC reference voltage signal; and wherein measuring the second voltage across the MR head includes measuring peak-to-peak voltage of the filtered and amplified second AC voltage signal.

6. The computer program product of claim 5 wherein measuring peak to peak voltage of the filtered and amplified AC reference voltage signal includes detecting a maximum and a minimum of the filtered and amplified AC reference voltage signal and converting the detected maximum AC reference voltage and the minimum AC reference voltage to digital values; and wherein measuring peak to peak voltage of the filtered and amplified second AC voltage signal includes detecting a maximum and a minimum of the filtered and amplified second AC voltage signal and converting the detected maximum second AC voltage and the minimum second AC voltage to digital values.

7. The computer program product of claim 1 further wherein applying a reference AC current to the reference resistance further includes applying the reference AC current to at least one bias resistor coupled in series with the reference resistance;

wherein applying a second AC current to the MR head further includes applying the second AC current to at least one bias resistor coupled in series with the MR head; and wherein calculating the MR head resistance as a function of the ratio of the measured second voltage to the measured reference voltage is independent of resistances of the bias resistors coupled to the reference resistance and the MR head.

8. The computer program product of claim 1 further comprising a selectable DC mode which includes:

measuring a DC reference voltage across a reference resistance assembly which includes the reference resistance and at least one bias resistor coupled in series with the reference resistance while applying a reference DC current to the reference resistance assembly to generate a DC reference voltage signal across the reference resistance assembly;

measuring a second DC voltage across a MR head assembly which includes the MR head and at least one bias resistor coupled in series with the MR head while applying a second DC current to the MR head assembly to generate the second DC voltage signal across the MR head assembly wherein the second DC current has a known proportionality to the reference DC current; and calculating the MR head resistance of the MR head assembly resistance as a function of a ratio of the measured second DC voltage to the measured DC reference voltage.

9. A computer-implemented method, comprising:
in a first AC mode:
measuring a reference voltage across a reference resistance while applying a reference AC current to the reference resistance to generate an AC reference voltage signal across the reference resistance;
measuring a second voltage across a magnetoresistive (MR) head while applying a second AC current to the MR head to generate a second AC voltage signal across the MR head wherein the second AC current has a known proportionality to the reference AC current; and
calculating the MR head resistance as a function of a ratio of the measured second voltage to the measured reference voltage.

10. The computer-implemented method of claim 9 wherein the measuring the second voltage across the MR head is performed while the MR head is installed in a storage drive for read/write operations in the storage drive.

11. The computer-implemented method of claim 9 wherein measuring the reference voltage includes amplifying the generated AC reference voltage signal and measuring peak-to-peak voltage of the amplified AC reference voltage signal; and wherein measuring the second voltage includes amplifying the generated second AC voltage signal and measuring peak-to-peak voltage of the amplified second AC voltage signal.

12. The computer-implemented method of claim 11 wherein measuring the reference voltage includes applying a reference DC current to the reference resistance to generate a DC reference voltage signal across the reference resistance, and filtering the DC reference voltage signal from the AC reference voltage signal before amplifying the AC reference voltage signal; and wherein measuring the second voltage includes applying a second DC current to the MR head to generate a second DC voltage signal across the MR head, and filtering the second DC voltage signal from the second AC voltage signal before amplifying the second AC voltage signal.

13. The computer-implemented method of claim 12 wherein measuring the reference voltage across the reference resistance includes measuring peak-to-peak voltage of the filtered and amplified AC reference voltage signal; and wherein measuring the second voltage across the MR head includes measuring peak-to-peak voltage of the filtered and amplified second AC voltage signal.

14. The computer-implemented method of claim 9 further wherein applying a reference AC current to the reference resistance further includes applying the reference AC current to at least one bias resistor coupled in series with the reference resistance;

wherein applying a second AC current to the MR head further includes applying the second AC current to at least one bias resistor coupled in series with the MR head; and wherein calculating the MR head resistance as a function of the ratio of the measured second voltage to the measured reference voltage is independent of resistances of the bias resistors coupled to the reference resistance and the MR head.

15. A computer system, comprising:
a storage system having a storage drive having magnetoresistive (MR) heads;
a host coupled to the storage system;
a processor of at least one component of the computer system; and
a computer program product for measuring resistance of an MR head of the storage system, wherein the computer program product comprises a computer readable storage medium having program instructions embodied therewith, the program instructions executable by a processor to cause operations, the operations comprising:
in a first AC mode:
measuring a reference voltage across a reference resistance while applying a reference AC current to the reference resistance to generate an AC reference voltage signal across the reference resistance;
measuring a second voltage across an MR head while applying a second AC current to the MR head to generate a second AC voltage signal across the MR head wherein the second AC current has a known proportionality to the reference AC current; and calculating the MR head resistance as a function of a ratio of the measured second voltage to the measured reference voltage.

16. The computer system of claim 15 wherein the measuring the second voltage across the MR head is performed while the MR head is installed in a storage drive for read/write operations in the storage drive.

17. The computer system of claim 15 wherein measuring the reference voltage includes amplifying the generated AC reference voltage signal and measuring peak-to-peak voltage of the amplified AC reference voltage signal; and wherein measuring the second voltage includes amplifying the generated second AC voltage signal and measuring peak-to-peak voltage of the amplified second AC voltage signal.

18. The computer system of claim 17 wherein measuring the reference voltage includes applying a reference DC current to the reference resistance to generate a DC reference voltage signal across the reference resistance, and filtering the DC reference voltage signal from the AC reference voltage signal before amplifying the AC reference voltage signal; and wherein measuring the second voltage includes applying a second DC current to the MR head to generate a second DC voltage signal across the MR head, and filtering the second DC voltage signal from the second AC voltage signal before amplifying the second AC voltage signal.

19. The computer system of claim 18 wherein measuring the reference voltage across the reference resistance includes measuring peak-to-peak voltage of the filtered and amplified AC reference voltage signal; and wherein measuring the second voltage across the MR head includes measuring peak-to-peak voltage of the filtered and amplified second AC voltage signal.

20. The computer system of claim 15 further wherein applying a reference AC current to the reference resistance further includes applying the reference AC current to at least one bias resistor coupled in series with the reference resistance;

wherein applying a second AC current to the MR head further includes applying the second AC current to at least one bias resistor coupled in series with the MR head; and wherein calculating the MR head resistance as a function of the ratio of the measured second voltage to the measured reference voltage is independent of resistances of the bias resistors coupled to the reference resistance and the MR head.

* * * * *